United States Patent [19]
Briggs et al.

[11] Patent Number: 5,157,749
[45] Date of Patent: Oct. 20, 1992

[54] HIGH PRECISION OPTICAL FIBER CONNECTORS

[75] Inventors: Robert C. Briggs, Newport; Lloyd R. Budd, Harrisburg; John C. Hoffer, Harrisburg; William J. Stape, Harrisburg; Donald W. Thompson, Mechanicsburg; Robert N. Weber, Hummelstown, all of Pa.

[73] Assignee: AMP Incorporated, Harrisburg, Pa.

[21] Appl. No.: 860,232

[22] Filed: Mar. 27, 1992

Related U.S. Application Data

[60] Continuation of Ser. No. 654,138, Feb. 11, 1991, abandoned, which is a division of Ser. No. 439,206, Nov. 17, 1989, Pat. No. 5,076,656, which is a continuation-in-part of Ser. No. 328,259, Mar. 23, 1989, abandoned, which is a continuation-in-part of Ser. No. 287,921, Dec. 21, 1988, abandoned, and a continuation-in-part of Ser. No. 734,831, May 17, 1985, which is a continuation-in-part of Ser. No. 618,851, Jun. 8, 1984, Pat. No. 4,687,291.

[51] Int. Cl.⁵ .............................................. G02B 6/36
[52] U.S. Cl. .................................... 385/60; 385/56; 385/59
[58] Field of Search .......................... 350/96.2, 96.21; 385/56, 58, 59, 60

[56] References Cited

U.S. PATENT DOCUMENTS

| | | | |
|---|---|---|---|
| 3,954,338 | 5/1976 | Hennel et al. | 350/96.21 |
| 4,167,303 | 9/1979 | Bowen et al. | 350/96.21 |
| 4,215,913 | 8/1980 | Turley et al. | 350/96.21 |
| 4,252,406 | 2/1981 | Ryan, Jr. et al. | 350/96.21 |
| 4,387,957 | 6/1983 | Mignien | 350/96.21 |
| 4,898,446 | 2/1990 | Hinckley | 350/96.2 |
| 4,960,317 | 10/1990 | Briggs et al. | 350/96.21 |
| 4,964,690 | 10/1990 | Lappöhn et al. | 350/96.21 |
| 5,011,258 | 4/1991 | Takeda | 35/96.2 |

Primary Examiner—John D. Lee
Assistant Examiner—John Ngo
Attorney, Agent, or Firm—Gerald K. Kita

[57] ABSTRACT

A connector for an optical fiber comprising, a body (86, 86') at least one ferrule (66, 66', 68, 68') encircling a corresponding optical fiber, a coil spring (337) compressible between a flange on the corresponding ferrule and a ridge (48) of the body (86, 86'), and the corresponding ferrule extends through a recess (52) in a second ridge (46) and is pivotally moveable in the recess (52).

13 Claims, 5 Drawing Sheets

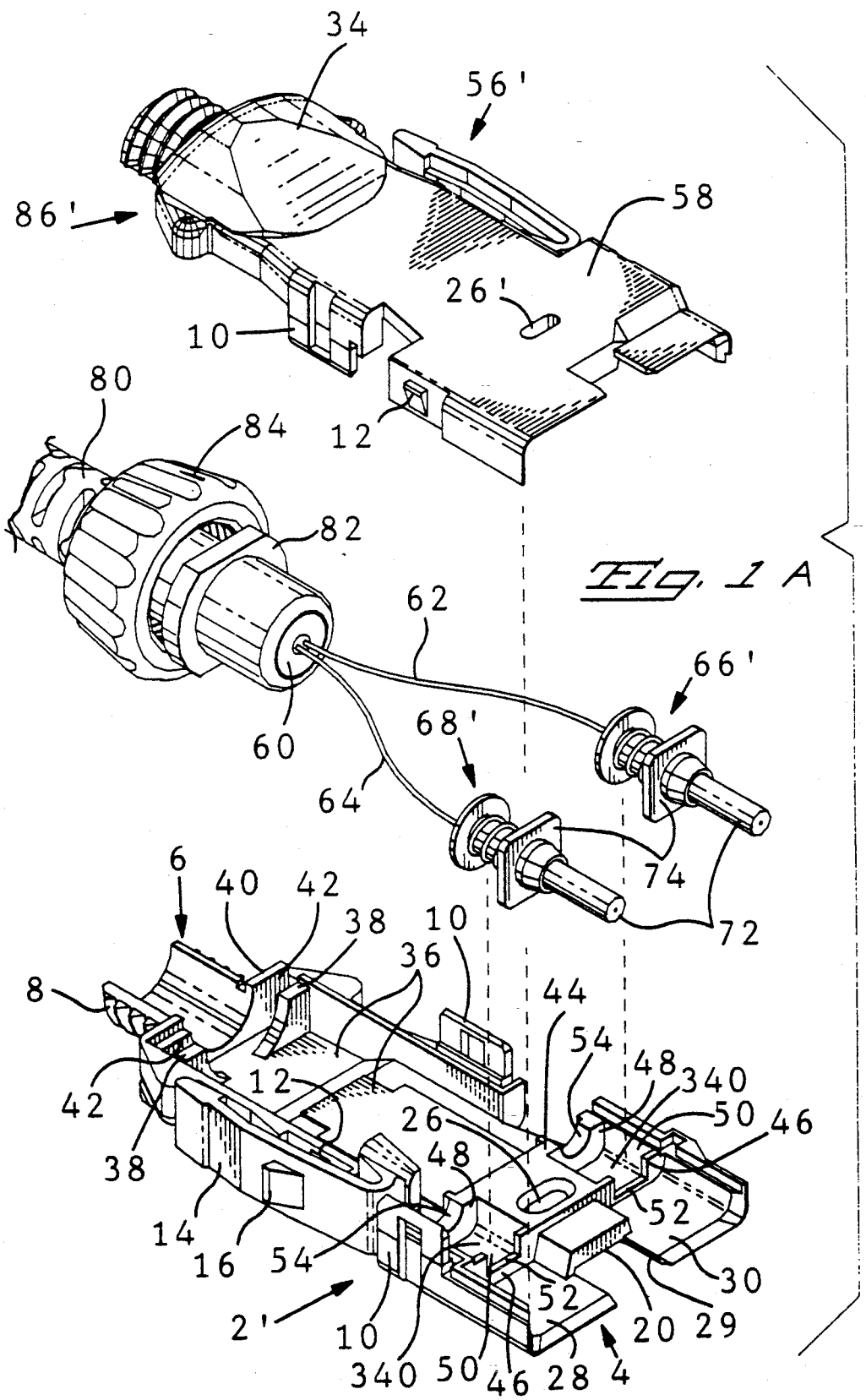

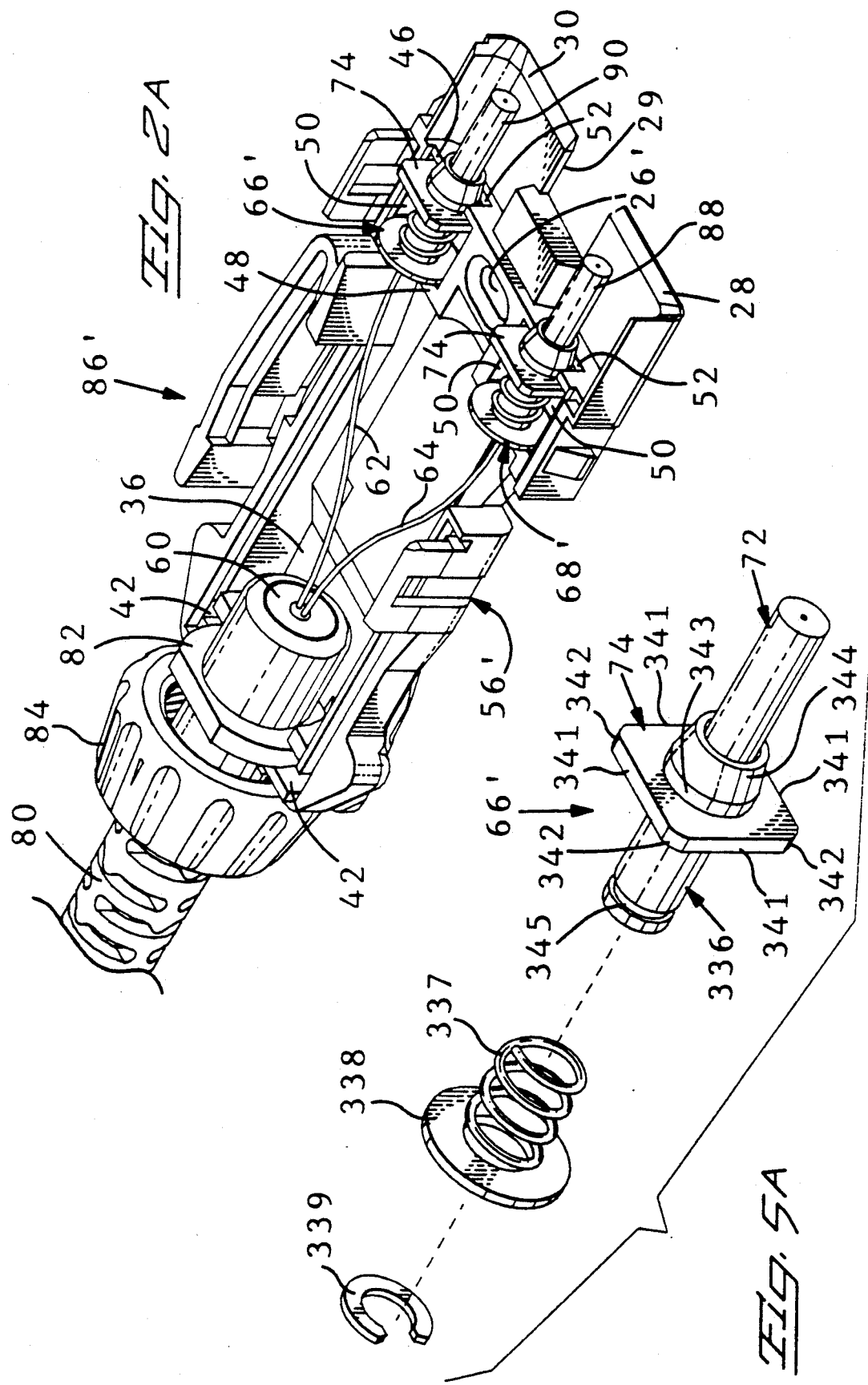

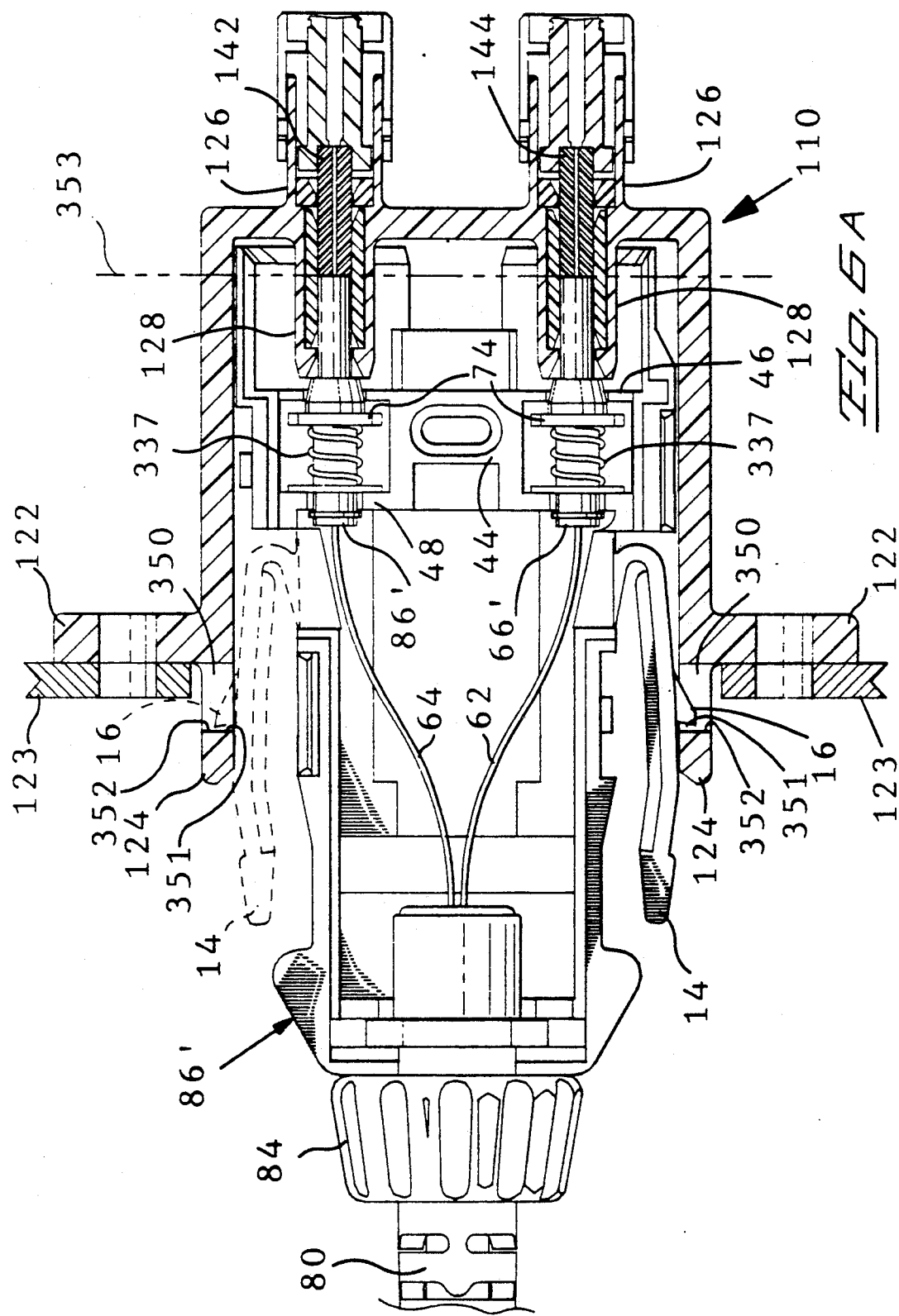

HIGH PRECISION OPTICAL FIBER CONNECTORS

CROSS REFERENCE TO RELATED APPLICATIONS

This application is a continuation of Ser. No. 07/654,138, filed Feb. 11, 1991, abandoned, in turn, a division of 07/439,206, filed Nov. 17, 1989, now U.S. Pat. No. 5,076,656, in turn a continuation in part of 07/328,259, filed Mar. 23, 1989, abandoned, in turn, a continuation in part of 07/287,921, filed Dec. 21, 1988 abandoned, and a continuation in part of 06,734,831, filed May 17, 1985 abandoned. Application 06/734,831 is a continuation in part of 06/618,851, filed June 8, 1984, now U.S. Pat. No. 4,687,291. Application 07/112,188 filed May 17, 1985 is a continuation in part of 06/734,831.

FIELD OF THE INVENTION

The specification is directed to a connector for an optical fiber cable, in which at least one ferrule encircles a corresponding optical fiber of the cable and aligns the optical fiber along an interior of the connector.

BACKGROUND OF THE INVENTION

A known connector for an optical fiber cable is disclosed in U.S. Pat. No. 4,178,068. The connector comprises, a body of the connector, at least one ferrule for encircling a corresponding optical fiber of the cable and for aligning the optical fiber along an interior of the body, coils of a compressible coil spring of the ferrule adapted for compression between a flange of the ferrule and a ridge of the body upon movement of the ferrule and the flange rearwardly of the body in response to pressure applied to a front of the ferrule.

The known connector is constructed for mated connection with a complementary connector, and for aligning an optical fiber in the known connector precisely in end to end alignment with another optical fiber in the complementary connector. The ferrule of the known connector precisely aligns the optical fiber along the axis of the ferrule. In turn, the ferrule is precisely aligned along an axis of the known connector. The coil spring biases the ferrule forwardly to prevent an air gap at the front of the optical fiber that would cause Fresnel effect reflections and allow scattered loss of optical signals being transferred from or to the optical fiber. U.S. Pat. No. 4,687,291 discloses a ferrule with an O-ring.

Each of U.S. Pat. Nos. 4,611,887, 4,167,303 and 4,233,724 discloses a spring biased ferrule.

SUMMARY OF THE INVENTION

The invention is directed to displacement of at least one ferrule for alignment of an optical fiber in a connector shell. Each ferrule is spring biased and constructed for axial displacement in the connector shell. A first flange of each said ferrule is displaceable along a cavity in the interior of the connector shell. A flange on the alignment ferrule has a noncircular periphery rotated by rotation of the ferrule to engage a side of the cavity. The noncircular periphery is slidable along the side of the cavity while the ferrule is axially displaced to compress the coil spring. Whereas, U.S. Pat. Nos. 4,418,983 and 4,477,146, disclose a ferrule with a noncircular retention flange, a pair of latching flanges ride over the retention flange and lock the ferrule to the connector. The ferrule is immobile.

Further according to the invention, a coil spring is compressed against a ridge of the connector and a flange of an alignment ferrule, and a forward end of the ferrule extends through a recess in the ridge and is pivotally moveable in the recess. The ferrule is pivotally moveable in the recess.

And further according to the invention, the ferrule has an increased capacity for pivotal movement in the recess when the ferrule has moved rearward along the recess.

Further according to the invention, compression of the coil spring is attained over a wide range of axial movement of the ferrule without a corresponding substantial increase in the spring bias. The connector is permitted unimpeded forward motion to assure connection of the connector. The ferrule is permitted a wide range of axial movement without applying excessive pressure to the ferrule or to an optical fiber in the ferrule.

An aspect of the invention is that the advantages and features described above are useful separately, or combined as one with another or combined as one with multiple others.

Other advantages and of the invention are disclosed, by way of example, by a detailed description that follows, together with accompanying drawings.

DESCRIPTION OF THE DRAWINGS

FIG. 1A is a fragmentary perspective view, with parts shown exploded, of a connector and ferrules connected to an optical cable.

FIG. 2A is a fragmentary perspective view of part of the connector and the ferrules and the cable partially assembled.

FIG. 5A is a perspective view, with parts shown exploded, of one of the ferrules.

FIG. 6A is a fragmentary plan view in section of part of the connector inserted into a housing.

Figure 3A:
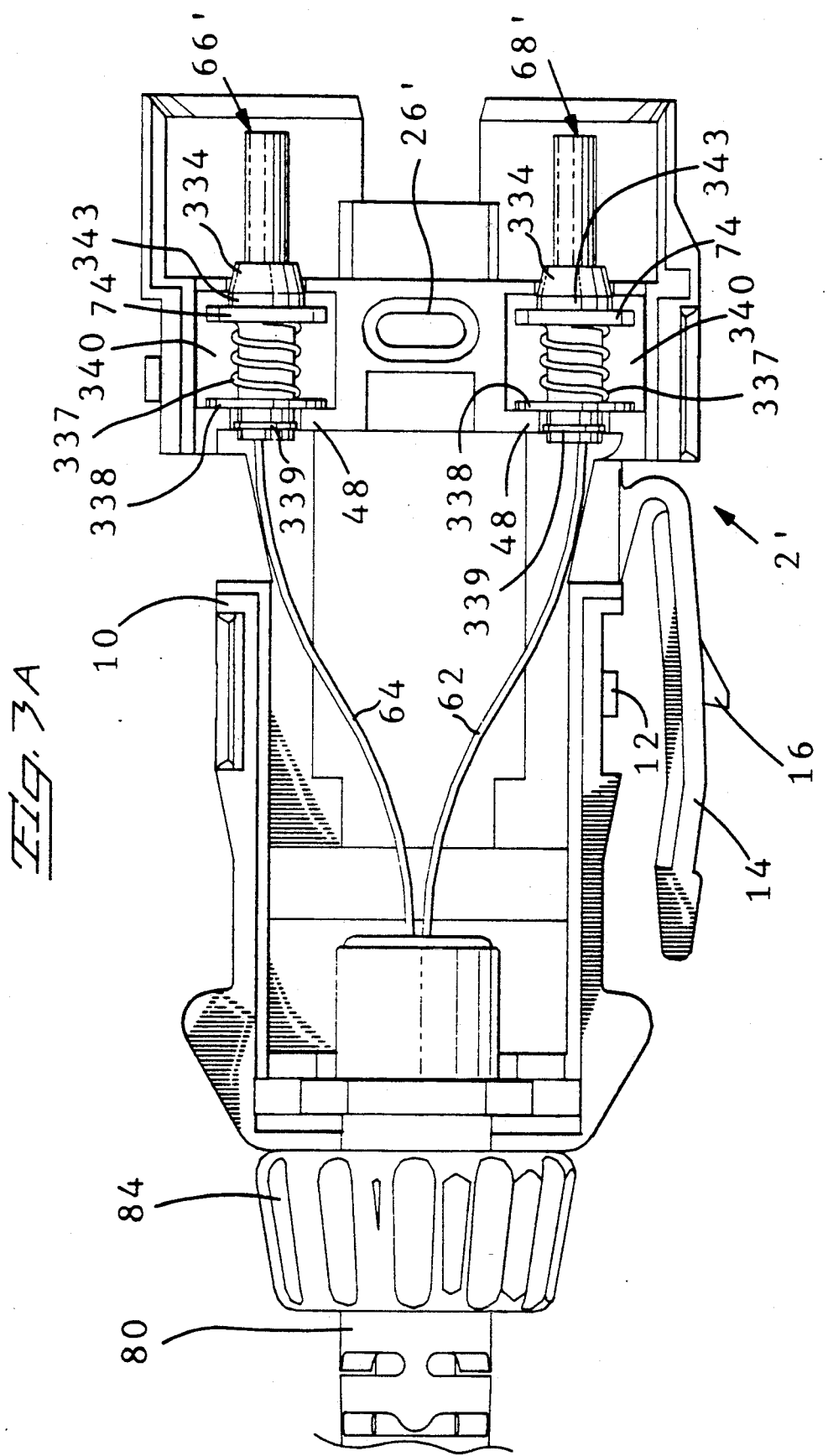
FIG. 3A is a fragmentary plan view of part of the connector and the ferrules, illustrating axial displacement of the ferrules.

The description of application Ser. No. 112,188 (abandoned) is specifically incorporated by reference herein. With more particular reference to FIGS. 1A and 2A, a portion 2' of a plug connector 86, includes a front end 4 and a rear portion 6 including a cable entry 8. Parts of the portion 2' and corresponding parts of the above described portion 2 are referred to by the same reference numerals. The portion 2' includes plug assembly latches 10 and plug assembly lugs 12, similarly as portion 2, and a latching arm 14 that includes a latching lug 16. Surface 18 has a channel 20 and a detent 22, not shown, that is similar to the channel 20 and detent 22 of the top portion 2. Aperture 26 extends from the detent 22 to the interior of portion 2'. A half of a male shroud element 28 and a half of a female shroud element 30 are offset at opposite sides of the front end 4. A space or gap 29 is between elements 28 and 30 in front of the channel 20. In an interior cavity 36, interior flanges 38 and a rear wall 40 form a pair of slots 42 on opposite sides of the cable entry 8. A bulkhead 44 forms a rigid mass around the aperture 26.

Extending laterally from the bulkhead are forward ribs or ridges 46 and rearward ribs or ridges 48. Between ridges 46 and 48 are cavities 50. Recesses 52 and 54 are formed in ridges 46 and 48, respectively, and communicate with cavities 50. Recesses 54 are semicircular. Recesses 52 are rectangular in shape.

With reference to FIG. 1A a second body portion 56' includes an exterior surface 58 that is substantially flat, with no channel therein. Parts of the portion 56' and corresponding parts of the above described portion 56 are referred to by the same reference numerals. An aperture portion or key element receiving passage 26' corresponds to that of aperture portion or key element receiving passage 26' in the portion 2.

With reference to FIG. 1A, a cable 60 having optical fibers 62 and 64 are terminated by ferrules 66' and 68', respectively. With reference to FIG. 1, the cable 60 is terminated by the corresponding ferrules 66 and 68. Each ferrule 66', 68' has a nose 72. An annular flange 74 is formed to surround a corresponding ferrule 66', 68'. Cable 60 is provided with a strain relief 80 having an integral annular flange 82. An internally threaded nut 84 is also provided. Cable 60, strain relief 80 and nut 84 have been described previously.

When assembling the components illustrated in FIG. 1A, ferrules 66' and 68' are seated in respective recesses 52 and 54 that are associated with ridges 46 and 48. Flanges 74 associated with the respective ferrules are seated in respective cavities 50 of portion 56'. Strain relief 80 is assembled with portion 56' with flange 82 positioned within slots 42. Optical fibers 62, 64 extend through cavity 36 extending between cable 60 and ferrules 66', 68'.

Portion 2' is brought into engagement with portion 56', and both are assembled to each other similarly as are portions 2 and 56, above described. When portion 2' and portion 56' are assembled to engage each other, ferrules 66', 68' are seated within cavities 50 and within recesses 52, 54 of portion 2' in the manner described with respect to portions 2 and 56.

Plug assembly latches 10 of portion 2' engage and latch against plug assembly lugs 12 of portion 56'. Latches 10 of portion 56' engage and latch against lugs 12 of the portion 2', thus securing the portions 2' and 56' together. Nut 84 is then threaded onto threaded cable entry portions 8, 8 completing assembly of the plug 86'.

Bulkheads 44, 44, forward ridges 46, 46 and rearward ridges 48, 48 of the portions 2', 56', respectively, engage each other when the portions 2' and 56' are brought together. This forms a substantially surrounding mass of material through the entire depth and width of the plug 86' and completely about aperture portions 26, 26'. This stiffens front end 4 of the plug 86', resisting deformation and making rigid a rectangular exterior portion of the plug 86' surrounding the aperture portions.

Aperture portions 26 and 26' are brought into end to end relationship, thus, forming a continuous keying element receiving passage through the plug 86'. The passage is a duplicate of the passage described in conjunction with FIG. 5.

When portions 2' and 56' are assembled, an assembled plug 86' is formed similar to the plug 86 described in conjunction with FIG. 6. A complete male shroud portion 28 and a complete female shroud 30 are formed, similar to the shroud portion 28 and the female shroud 30 described in conjunction with FIG. 6. Gaps 29 are formed, similarly as the gaps 29 of the plug 86 are formed. A pair of terminated ends 88, 90 of optical fibers extend from end 4 of the plug 86' within the area protected by the shroud comprising portions 28 and 30. Ends 88 and 90 correspond to the nose portions 72, 72 of ferrules 66', 68'. When viewed from the end 4, the plug 86' will appear substantially rectangular in shape. The keying element 94 is constructed for insertion into plug 86' in the same manner as described in conjunction with the plug 86. The plug 86' is interchangeable with the plug 86 for insertion into receptacles 110 and 146 and 170, as disclosed in abandoned application Ser. No. 112,188.

With reference to FIG. 5A, the construction of ferrule 66' will be described. The description of ferrule 66' applies as well to ferrule 68' that is of a construction similar to that of ferrule 66'. The ferrule 66' includes a cylindrical nose 72 assembled concentric with the corresponding optical fiber 62. The flange 74 is on a hollow cylindrical body 336, the axis of which is coaxial with that of the nose 72. The body 336 and/or the nose 72 can be constructed of ceramic, metal, plastic or other material and assembled to provide a unitary construction. Unitary construction is meant to include a one piece nose 72 and body 336. A coil spring 337 is assembled to encircle the body 336. The coil spring 337 has at its rear end, a washer 38 of enlarged external diameter as compared to the external diameter of a remainder of the spring 337. For example, the washer 338 can be welded unitary with the rear end of the coil spring 337. A spring clip 339 has an open side to provide the spring clip 339 with a "C" shape. The open side widens resiliently to be received over the ferrule 66', 68' in a circumferential groove 345 spaced rearward of the flange 74. The spring clip 339 is fixed in position rearward of the coil spring 337 and resists disassembly of the coil spring 337 from the body 336.

With reference to FIG. 2A, the ferrules 66' and 68' are assembled with the plug portion 2', or alternatively, with the portion 26'. Thereafter, the plug portion 26' is assembled to the portion 2' to enclose the ferrules 66' and 68'. Each ferrule 66', 68' is assembled in the plug 86' with its corresponding flange 74 and coil spring 337 in a corresponding cavity 50. Each coil spring 337 is in moderate compression between the corresponding flange 74 and a corresponding ridge 48, while the corresponding rear end 338 engages a front of a corresponding ridge 48 and while a corresponding flange 74 engages against a rear of a corresponding ridge 46. The coil spring 337 in moderate compression will retain the corresponding ferrule 66', 68' in place during assembly of the portions 2' and 56' to each other. Each ferrule 66', 68' is aligned axially by a corresponding recess 52, a corresponding cavity 50 and a corresponding recess 54 for insertion into and along a corresponding cylindrical extension 128, above described, in application Ser. No. 112,188, or into and along a corresponding alignment bushing 310, above described, or for mating with a corresponding port 162 or 164, also above described.

In addition, and with reference to FIG. 3A, the coil spring 337 of each ferrule 66', 68' is adapted for compression between the corresponding ridge 48 and a corresponding flange 74 upon movement of the corresponding ferrule 66', 68' and corresponding flange 74 rearwardly of the plug 86' in response to pressure applied to a front of the corresponding ferrule 66', 68'.

Each coil spring 337 provides a spring bias that impels a corresponding ferrule 66', 68' forwardly. The coil spring 337 is selected with a spring rate that is relatively low, thereby to produce a relatively low pressure applied to the ends of the engaged optical fibers 62, 142 and of the engaged optical fibers 64, 144. If pressure is excessive, the optical fibers will be damaged. The spring rate of the coil spring 337 is defined as the rate of increase in force produced by the coil spring 337 in proportion to the distance of compression of the coil spring 337. The force produced by the coil spring 337 provides the spring bias that urges the corresponding ferrule 66', 68' forwardly.

The axial length of each coil spring 337 is long, in comparison to that of an O-ring, to permit compression of the coil spring 337 over a wide range of axial movement of the corresponding ferrule 66', 68'. The coils of each coil spring 337 are open and spaced apart to prevent the coils from being compressed against each other. The spring rate, in addition to being relatively low is also constant over a wide range of compression of the coil spring 337. This permits compression of the coil spring 337 over a wide range of distances, in response to axial movement of the ferrule over a corresponding range of distances, without a corresponding substantial increase in the spring bias that might apply excessive pressure to the ends of the optical fibers 66, 68, or the ferrules 66', 68'. For example, with reference to FIG. 3A, each ferrule 66', 68' is illustrated as having been moved axially and rearward against the spring bias to corresponding positions shown in the Figure. The spring rate of each coil spring 337 is selected to provide a low increase in spring force corresponding to the rearward movement of the ferrule 66', 68'.

Each ferrule 66', 68' is constructed for movement to reposition itself. Each ferrule 66', 68' is permitted to move axially, rotationally and pivotally. Such movement of each ferrule 66', 68' laterally of its axis is allowed by a loose fit of the corresponding ferrule 66', 68'. Each ferrule 66', 68', including a corresponding spring clip 339, is received with a loose fit along each encircling, corresponding recess 54 of the assembled portions 2' and 56'. A periphery of each cylindrical body 336 is received with a loose fit along lateral sides of each corresponding recess 52. The lateral sides encircle a corresponding body 336 when the portions 2' and 56' are assembled together. A periphery of each flange 74 is received with a loose fit along lateral, encircling sides 340 of a corresponding cavity 50 of the assembled portions 2' and 56'.

The periphery of each said flange 74 includes multiple intersecting sides 341. Each flange 74 has a noncircular periphery, for example, a square periphery. The lateral side 340 of each said cavity 50 is straight in an axial direction. The lateral side 340 is also planar. Each flange 74 is constructed for sliding engagement with a lateral side 340 of a corresponding cavity 50 during axial movement of a corresponding ferrule 66', 68'. Chamfered corners 342 of the square periphery reduce sharp edges that might catch against the lateral side 340 of the corresponding cavity 50. Thus, the flange 74 has a transverse profile that is a square with chamfers at the corners. The flange 74 is asymmetric about the longitudinal axis of the corresponding ferrule 66', 68' such that the flange 74 can be assembled in the cavity 50 in one of a number of asymmetric orientations.

Each ferrule 66', 68' is constructed for limited pivotal movement. Forward of the flange 74, the unitary construction is provided, for example, on the body 336 with a cylindrical portion 343 and a unitary frusto conical portion 344 tapering forwardly. The transverse profile of the cylindrical portion 343 is circular. The cylindrical portion 343 is greater in transverse profile than that of the nose 74 and that of the frusto conical portion 344. The cylindrical portion 343 is lesser in transverse profile than at least a portion of the ferrule 66', 68' rearward of the cylindrical portion 343. For example, the cylindrical portion 343 is lesser in transverse profile than that of the flange 74 and fits with a loose fit in a corresponding recess 52. This loose fit allows the corresponding ferrule 66', 68' to pivot while being aligned within the corresponding recess 52,54, while the corresponding flange 74 is engaged on the corresponding ridge 46.

Figure 4A:
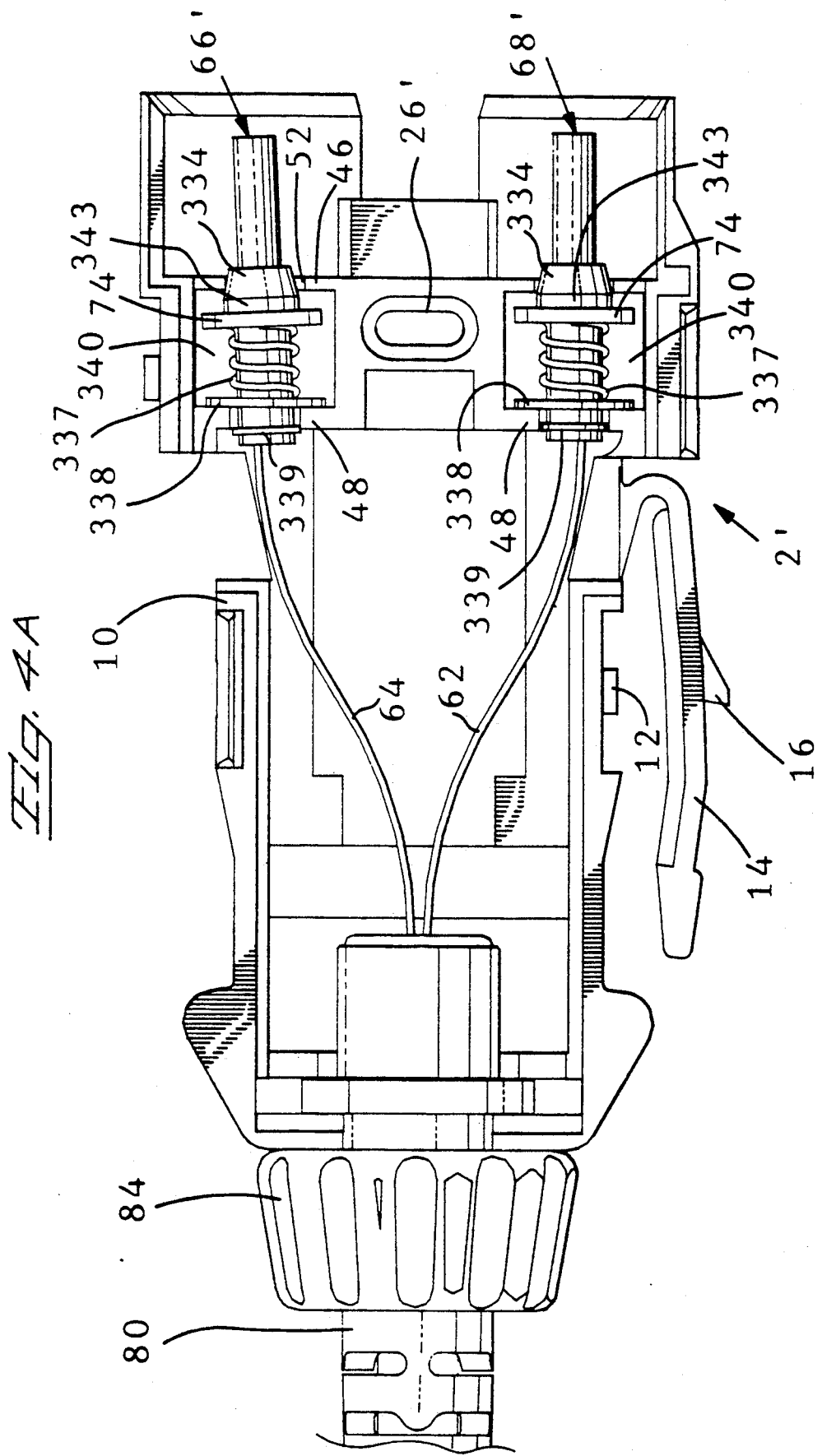
FIG. 4A is a fragmentary plan view of part of the connector and the ferrules, illustrating pivotal displacement of the ferrules.

Upon axial movement rearwardly, the corresponding flange 74 will disengage from the corresponding ridge 46 and will move rearward. Further with reference to FIG. 3A, the corresponding cylindrical portion 343 and unitary frusto conical portion 344 also will move rearward, such that the cylindrical portion 343 is removed from a corresponding recess 52, and a frusto conical portion 344 is received in the corresponding recess 52. In FIGS. 3A and 4A, each ferrule 66', 68' is illustrated as being moved axially rearward, with the corresponding frusto conical portion 344 received in the corresponding recess 50.

Because the frusto conical portion 344 is of relative, reduced diameter as compared to the diameter of the cylindrical portion 343, the corresponding ferrule 66', 68' is received in the corresponding recess 52, 52 with a further loose fit than before. Such a further loose fit will allow each corresponding ferrule 66', 68' to pivot while yet being aligned within the corresponding recesses 52 and 54. With reference to FIG. 4A, the ferrule 66' is illustrated as being pivoted, with the frusto conical portion 344 received in the corresponding recess 50. As this Figure illustrates, the corresponding ferrule 66', 68' has an increased capacity for pivotal movement as the corresponding frusto conical portion 344 is moved into a corresponding recess 52. The low spring force of the corresponding coil spring 337 allows the coil spring to deflect transversely as each ferrule 66', 68' pivots within the constraints of a corresponding recess 52, while the corresponding ferrule 66', 68' is in a position as shown in FIG. 3A or in a position as shown in FIG. 4A, or in a position within a range of positions between the position as shown in FIG. 3A and the position as shown in FIG. 4A. Upon unmating, or disconnection of the plug 86', the pressure applied to each of the ferrules 66', 68' is relieved. The corresponding coil spring 337 will bias a corresponding ferrule 66', 68' forward axially until a corresponding flange 74 engages a corresponding ridge 46. Each ferrule 66', 68' centers itself along a corresponding recess 52 according to the following description. Each frusto covered portion 344 tapers forwardly, and will engage against lateral sides of a corresponding recess 52 to center a corresponding ferrule 66', 68' along the recess 52 until a corresponding cylindrical portion 343 is received centrally along the recess 52. The tapered construction of each frusto conical portion 344 assures that the corresponding ferrule 66'68' will move forward without catching against the ridge 46.

Compression of the coil spring over a wide range of distances without substantial increase in the spring bias, is further advantageous, as disclosed in conjunction with FIG. 6A. With reference to FIG. 6A, the housing 110 is illustrated with the plug 86'. The housing 110 has been described previously in conjunction with FIG. 21. The plug 86' is inserted into the housing 110 in place of the plug 86, by applying a forward bias to impel the plug 86' forwardly. Forward movement of the plug 86' during insertion into the housing 110 is accompanied by movement of the latching lugs 16 into corresponding openings of the latching ears 124, and by insertion of the corresponding ferrules 66', 68' into corresponding cylindrical extensions 128. The plug 86' is moved forwardly until the corresponding latching lugs 16 are received in corresponding openings of the latching ears 124. The coil springs 337 compress to allow the corresponding ferrules 66', 68' to move rearward when they engage corresponding ferrules 142, 144.

Because compression of the coil springs 337 is attained over a large range of axial movements of the ferrules 66', 68', and because such compression develops only the aforementioned low spring force, substantially unimpeded forward movement of the plug 86' can occur, and substantially unimpeded forward movement of the lugs 16 to corresponding forward positions within the corresponding openings 350 of the ears 124 can occur, until a clearance 351 is established between each lug 16 and a rearward edge 352 of a corresponding opening 350 of each ear 124. This unimpeded forward movement of the lugs 16 to forward positions is called, overtravel. Overtravel insures that the lugs 16 are simultaneously positioned for latching within corresponding openings of the ears 124. Overtravel is attained by permitting unimpeded forward movement of the plug 86'. Attainment of overtravel is further enhanced by the plug 86' having a capacity for one motion of the plug 86' during its insertion into and along the housing 110. After the plug 86' has been fully inserted, and the forward bias on the plug 86' has been released, the low spring force is sufficient to impel the plug 86' rearward of the housing 110 until the lugs 16 simultaneously register against the rearward edges 352 of the openings 350 of the ears 124 to hold the plug 86, in static position. Each spring 337 is designed to provide a force according to the following criteria. The end of each ferrule 66', 68' shall seat to an optical reference plane with a static force of 0.68 Kg. (1.5 lb.) minimum to 1.36 Kg. (3 lbs.) maximum per ferrule. In the housing 110, the reference plane is at the end of the ferrule 142 and also at the end of the ferrule 144, for example, along the centerline 353. Although the plug 86' has been described for connection in the housing 110, the plug 86' is constructed for connection with other forms of housings.

What is claimed is:

1. A connector for an optical fiber cable comprising: a body of the connector, at least one ferrule for encircling a corresponding optical fiber of the cable and for aligning the optical fiber along an interior of the body, coils of a compressible coil spring of the ferrule adapted for compression between a flange of the ferrule and a corresponding ridge of the body upon movement of the ferrule and the flange rearwardly of the body in response to pressure applied to a front of the ferrule, wherein the improvement comprises:
    said flange of each said ferrule has a periphery that is engageable with a lateral side of the cavity of said body and is slidable along said lateral side during movement of said ferrule rearwardly of said body,
    each said cavity extends between a corresponding ridge and a corresponding second ridge of said body,
    a corresponding spring is compressed against a corresponding ridge and a corresponding flange, and
    a forward end of each said ferrule extends through a recess in a corresponding second ridge and is pivotally moveable in said recess.

2. A connector as recited in claim 1, wherein the improvement further comprises; said lateral side of each said cavity extends uniformly straight along said body.

3. A connector as recited in claim 2, wherein the improvement further comprises; said lateral side of each said cavity is straight, and said periphery of each said flange includes multiple intersecting sides.

4. A connector as recited in claim 2, wherein the improvement further comprises; each said cavity extends between a corresponding ridge and a second ridge of said body, and said flange of each said ferrule is within a corresponding cavity.

5. A connector as recited in claim 1, wherein the improvement further comprises; said lateral side of each said cavity is straight planar, and said periphery of each said flange includes multiple intersecting sides.

6. A connector as recited in claim 1, wherein the improvement comprises; each said capacity extends between a corresponding ridge and a second ridge of said body, and said flange of each said ferrule is within a corresponding cavity.

7. A connector as recited in claim 1, wherein the improvement further comprises; each said flange has a noncircular periphery.

8. A connector as recited in claim 1, wherein the improvement further comprises; each cavity has a noncircular transverse profile.

9. A connector for an optical fiber cable comprising, a body of said connector, at least one ferrule for encircling a corresponding optical fiber of said cable and for aligning said optical fiber along an interior of said body, coils of a compressible coil spring of said ferrule adapted for compression between a corresponding first ridge of said body upon movement of said ferrule and said flange rearwardly of said connector shell in response to pressure applied to a front of said ferrule, wherein the improvement comprises;
    a corresponding cavity extends between each said first ridge and a corresponding second ridge of said body,
    each said coil spring is compressed between a corresponding first ridge and a corresponding flange, and a forward end of each said ferrule extends through a recess in a corresponding second ridge and is pivotally moveable in said recess.

10. A connector as recited in claim 9, wherein the improvement further comprises; each said forward end has a frusto conical portion received in a corresponding said recess in a corresponding second ridge upon movement of said ferrule rearwardly.

11. A connector as recited in claim 9, wherein the improvement further comprises; each said forward end has a portion of lesser transverse profile than that of a corresponding flange, and said portion is received in a corresponding said recess in a corresponding second ridge when said corresponding flange engages said corresponding second ridge.

12. A connector as recited in claim 9, wherein the improvement further comprises; each said forward end has a second portion of lesser transverse profile than that of a said first recited portion, and said second portion is received in a corresponding said recess in a corresponding second ridge upon movement of said ferrule rearwardly.

13. A connector as recited in claim 9, wherein the improvement further comprises; said forward end of said said ferrule is received with a loose fit in a corresponding said recess, and thereby is pivotally moveable in said recess while the corresponding flange is engaged on said corresponding second ridge.

* * * * *